United States Patent
Rassaian et al.

(10) Patent No.: US 10,183,449 B2
(45) Date of Patent: Jan. 22, 2019

(54) LAMINATION PARAMETER-BASED METHOD FOR OPTIMAL DESIGN AND MANUFACTURING OPTIONS

(71) Applicant: The Boeing Company, Chicago, IL (US)

(72) Inventors: Mostafa Rassaian, Bellevue, WA (US); Michael A. Epton, Seattle, WA (US); Evin J. Cramer, Mercer Island, WA (US); Vladimir Balabanov, Mukilteo, WA (US); Olaf Weckner, Seattle, WA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 14/866,597

(22) Filed: Sep. 25, 2015

(65) Prior Publication Data

US 2017/0087779 A1    Mar. 30, 2017

(51) Int. Cl.
*B29C 70/30* (2006.01)

(52) U.S. Cl.
CPC .................. *B29C 70/30* (2013.01)

(58) Field of Classification Search
CPC .................................................. B29C 70/30
USPC ......................................................... 156/64
See application file for complete search history.

(56) References Cited

U.S. PATENT DOCUMENTS

| | | | |
|---|---|---|---|
| 7,243,055 B2 * | 7/2007 | Chen .................. | B29C 70/30 |
| | | | 345/420 |
| 8,645,110 B1 | 2/2014 | Weckner et al. | |
| 2006/0029807 A1 * | 2/2006 | Peck .................. | B32B 37/00 |
| | | | 428/411.1 |
| 2010/0051167 A1 * | 3/2010 | Hunter ............... | B29C 70/00 |
| | | | 156/64 |
| 2013/0330503 A1 * | 12/2013 | Kismarton .......... | B32B 5/12 |
| | | | 428/113 |
| 2015/0142149 A1 * | 5/2015 | Collier ............... | G05B 19/4097 |
| | | | 700/98 |

OTHER PUBLICATIONS

Miki, et al "Optimum Design of Lamianted Composite Plates Using Lamiantion Parameters", AIAA Journal, vol. 31, No. 5, May 1993, pp. 921-912.*
Liu, et al "Permutation generic algorithm for stacking sequence design of composite lamiantes", Comput. Methods Appl. Mech> Engrg., 186 (2000) pp. 357-372.*
(Continued)

*Primary Examiner* — Jeffry H Aftergut
(74) *Attorney, Agent, or Firm* — Ostrager Chong Flaherty & Broitman P.C.

(57) ABSTRACT

A design process that uses lamination parameter inversion to generate a set of baseline layups having desired stiffness properties. Then the underdetermined Newton's method can be applied to explore solution manifolds describing alternative designs having similar if not identical stiffness properties. The manifold of solutions can be methodically examined to find those with desirable properties. Desirable properties include those that have been traditionally captured by design rules or those that improve manufacturability. Combining lamination parameters as design variables with lamination parameter inversion provides an efficient optimization process for non-traditional laminates.

20 Claims, 4 Drawing Sheets

(56) References Cited

OTHER PUBLICATIONS

Starnes, et al "Preliminary Design of Comp[osite Wings for Buckling, Strength, and Displacement COnstraints", J. Aircraft, Aug. 1979, pp. 564-570.*

Nagendra, et al, "Stacking Sequence Optimization of Simply Supported Laminates with Stability and Strain COnstraints", AIAA Journal, 1992, pp. 2526-2535.*

* cited by examiner

LAMINATION PARAMETER-BASED METHOD FOR OPTIMAL DESIGN AND MANUFACTURING OPTIONS

BACKGROUND

The present disclosure relates generally to composite structures and, more particularly, to systems and methods for designing and manufacturing composite structures.

Composite structures provide several advantages over metallic structures. For example, composite structures can be configured to provide high specific stiffness and high specific strength relative to metallic structures. Furthermore, composite structures can be tailored to provide a relatively high degree of strength and stiffness along a primary load path. The ability to tailor the strength and stiffness of composites may result in lightweight structures. In addition, composite materials may have improved fatigue resistance relative to metallic materials and are more resistant to corrosion.

Composite structures may be formed as a stack of relatively thin layers or plies that are laminated together. Each ply in the composite laminate may include fibers that serve as the primary load-carrying constituent. The composite material may be formed as unidirectional tape wherein the fibers in each ply are oriented parallel to one another and are held in position by a matrix constituent such as an epoxy resin. The matrix constituent may also redistribute loads between adjacent fibers.

The composite structure may be configured such that the fibers in one ply are oriented in the same direction of the composite structure or in a different direction than the fibers in adjacent plies. The relative orientations of the plies may be selected to provide the desired strength and stiffness characteristics of the composite structure. Each ply in the composite laminate may be formed of the same material system. However, composite structures may also be formed as hybrid structures containing plies formed of different materials to achieve a desired design objective.

Conventional methods of designing a composite structure include constructing a finite element model (FEM) of the structure and subjecting the FEM to virtual loads to determine the stresses and strains in the structure and to perform sizing of the structure to meet strength, stiffness and weight requirements. An FEM is typically comprised of a mesh of multiple finite elements. Each element may represent one or more components or sub-components of the composite structure.

The process of designing a composite structure may include optimizing several design variables. Such design variables may include the geometry of the components and subcomponents that make up the composite structure. The geometry may include the size (i. e., length, width, height) and the shape of the components and sub-components. Additional design variables that may be optimized in the design process include the ply arrangement for the composite laminates to meet strength, stiffness, weight and other requirements. In many applications, the performance of a composite airplane structure can be adequately described by its plate stiffnesses; the A, B and D matrices.

Conventional methods of designing composite laminates include a determination of the stacking sequence of the laminate, including a determination of the individual ply thickness, the fiber angle of each ply, and the relative location of the ply in the through-the-thickness direction. For certain structures, loading conditions may dictate a laminate thickness requiring a relatively large quantity of plies. For example, a wing panel of an aircraft may require up to one hundred or more plies of composite material, each of which requires the determination of the fiber angle and the ply thickness. As may be appreciated, a ply-by-ply determination of such a stacking sequence for relatively thick composite laminates adds many design variables to the design process, which significantly increases the complexity of the design process. A further set of design variables that may be included in designing a composite structure is the material system of the plies that make up the composite laminate. The design of composite structures requires the knowledge of the thickness, orientation and material system for each ply within the stacking sequence. In order to find the most efficient structure (often the lightest weight design), the best possible combination of these parameters needs to be obtained.

This can become computationally challenging especially when the number of plies becomes large. This is the case even when ply orientations are restricted to the four traditional ply orientations: 0°, ±45° and 90°. The challenge becomes greater when non-traditional laminates are allowed. A composite laminate having at least one ply with fiber angle which is not equal to any one of the traditional ply orientations is referred to herein as a "non-traditional" layup or laminate.

There exists a need in the art for systems and methods for optimizing a composite structure that can characterize stacking sequences having a large number of plies in a computationally efficient manner.

SUMMARY

The stiffness properties of structural laminates (used in airplane construction and other applications) are determined by the physical properties of the fiber material and the geometric properties of the actual layup. To take full advantage of the potential weight savings that structures made of composite materials offer, it is necessary to deviate from the traditional composite layups that consist of 0, ±45 and 90-degrees ply angles only. The most efficient distribution of angles in the composite panel will require adjusting each angle in the layup. This is challenging for optimization of a structure with thick layups. For example in composite wing structure the number of layers in the skin exceeds 100. Directly adjusting each ply angle independently and optimizing for the best angles is computationally daunting.

One of the methods to efficiently adjust plies angles of a composite layup is to introduce lamination parameters. Lamination parameters provide an efficient encapsulation of the geometric properties while being more suitable for the task of design optimization. Lamination parameters characterize the stacking sequence (plies order and plies orientation) of the composite laminate. The number of terms needed to fully characterize these plate stiffnesses is typically fewer than the number of parameters needed to fully describe the thickness, orientation and material system of assembly of plies. The minimal specification consists of the lamination parameters and the material invariants. The proposed set of design variables—the lamination parameters and the material invariants—efficiently parameterize the plate stiffnesses. These stiffnesses are used in the majority of margin checks typically performed in airplane design. They are used for both elastic properties such as stability and inelastic properties such as strength and allowables.

The advantage of using lamination parameters as design variables in optimization is that the A, B and D matrices are linear functions of lamination parameters, but highly nonlinear functions of fiber angles. In addition, not more than twelve independent lamination parameters describe the behavior of a general laminate consisting of any number of plies of any direction, as long as the plies are of the same material. For symmetric layups, only eight lamination parameters are nonzero. There are six nonzero lamination parameters for laminates that are both symmetric and balanced. These numbers are usually considerably smaller than the number of ply angles that would otherwise be used.

As used herein, the term "fiber angle" refers to the angle of parallel fibers in a ply, measured relative to a reference direction or axis. As used herein, the term "symmetric laminate" means a laminate in which for every ply above the laminate midplane, there is an identical ply (material and ply angle) an equal distance below the midplane. (Accordingly, as used herein, the term "unsymmetric laminate" means a laminate which is not a symmetric laminate.) As used herein, the term "balanced laminate" means a laminate in which for every ply having a +θ ply angle, there is another ply having a −θ ply angle somewhere in the laminate. This pair of plies having ply angles of ±θ need not be adjacent to each other.

There are frequently many different stacking sequences that can produce the same A, B and D stiffness matrices. However there is only one set of lamination parameters corresponding to a given A, B, D set. There are twelve normalized lamination parameters. Therefore the maximum number of variables when performing trade studies, design space exploration or optimization is thirteen: twelve normalized lamination parameters and one total thickness. If the problem is formulated with a direct method using ply angles and thickness to define the stacking sequence, the problem becomes not only larger, but more ill-posed for a search algorithm, implying that it is less likely to find the optimal solution. In this disclosure, effective numerical methods based on lamination parameters will be described which optimize the layup of individual panels for minimum weight, and provide layup choices to improve the manufacturing process for the expansion of the design space that includes non-traditional laminates.

Lamination parameter inversion is a process for finding families of layup alternatives with stiffness matrices specified by their lamination parameters. The design process proposed herein uses lamination parameter inversion to generate a set of baseline layups having desired stiffness properties. Then the underdetermined Newton's method can be applied to explore solution manifolds describing alternative designs having identical stiffness properties. The manifold of solutions can be methodically examined to find those with desirable properties. Desirable properties include those that have been traditionally captured by design rules or those that improve manufacturability. Also combining lamination parameters as design variables with lamination parameter inversion provides an efficient optimization process for non-traditional laminates.

One aspect of the subject matter disclosed in detail below is a method for designing and manufacturing a composite laminate, the method comprising: generating target lamination parameters for a composite laminate using optimization; generating a baseline set of layups having lamination parameters which match the target lamination parameters using lamination parameter inversion; determining additional layup solutions lying on a same solution manifold for each baseline layup; and manufacturing a composite laminate having a layup corresponding to an additional layup solution.

Another aspect of the subject matter disclosed in detail below is a method for designing and manufacturing a composite laminate, the method comprising: (a) generating target lamination parameters for a composite laminate using optimization; (b) generating a baseline set of layups having lamination parameters which match the target lamination parameters; (c) determining additional layup solutions lying on a same solution manifold for each baseline layup; (d) filtering layups on solution manifolds using design rules to produce a reduced set of candidate layups; (e) verifying other properties of the candidate layups; and (f) manufacturing a composite laminate having a layup corresponding to a candidate layup having verified properties. Each candidate layup has stiffness properties which are similar to stiffness properties characterized by the target lamination parameters.

In accordance with some embodiments, process (a) of the method described in the preceding paragraph comprises: selecting design variables; determining design constraint functions; selecting an objective function; and determining an optimal value of the objective function that satisfies user-provided limits on both the design variables and the constraint functions by solving a constrained optimization problem, producing target lamination parameters are functions of the optimal design variables describing the optimal value of the objective function. The design variables can be a set of fiber angles and ply thicknesses or a set of lamination parameters and total thickness. If the optimization variables are fiber angles and ply thicknesses, then they must be converted to lamination parameters before proceeding.

In accordance with some embodiments, process (b) of the method comprises: defining a layup strategy; selecting a number of solution attempts to be made; and employing the layup strategy by executing a mathematical method with a number of random initial points searching for layups whose lamination parameters match the target lamination parameters in which the number of random initial points equals the number of solution attempts to be made. The mathematical method may be an underdetermined Newton's method or an algebraic geometry method. In accordance with those same embodiments, process (c) comprises recursively applying a curve tracing algorithm to determine points on the solution manifold containing the baseline layup.

A further aspect of the subject matter disclosed in detail below is a method for manufacturing a laminated composite structure using plies of fiber-reinforced plastic, the method comprising: (a) determining target lamination parameters; (b) determining a set of baseline layups whose lamination parameters match the target lamination parameters using lamination parameter inversion; (c) determining alternative layups lying on a solution manifold for each of the baseline layups; (d) selecting alternative layups which satisfy a set of design rules; (e) assessing performance of a selected alternative layup using engineering analysis; and (f) manufacturing a laminated composite structure that has the selected alternative layup.

In accordance with some embodiments, process (b) of the method described in the preceding paragraph comprises: defining a layup strategy; selecting a number of solution attempts to be made; and employing the layup strategy, executing a mathematical method with a number of random initial points searching for layups whose lamination parameters match the target lamination parameters, wherein the number of random initial points equals the number of solution attempts to be made. In accordance with those same embodiments, process (c) comprises recursively applying a curve tracing algorithm to determine points on the solution manifold containing the baseline layup. The engineering analysis may comprise determination of maximum strains and buckling analysis. At least processes (b), (c) and (e) are performed by a computer system. Process (f) comprises laying tows of fiber-reinforced plastic material using an automated tow placement machine.

Other aspects of composite structures and methods for their design and manufacture are disclosed below.

DETAILED DESCRIPTION

Various embodiments of methods for designing and manufacturing multi-ply composite structures will be described in detail below. The following detailed description is illustrative in nature and not intended to limit claim coverage to the disclosed embodiments or to the disclosed applications and uses of the disclosed embodiments.

The subject matter disclosed in detail below is directed to methods for optimizing a composite structure using lamination parameters. Lamination parameters are the most compact description of the most relevant properties of a composite layup. This makes them ideal for exploring the large design space of stacking sequences and identifying the lightest weight design using optimization. This disclosure further discloses solutions to the inverse problem of finding a stacking sequence for a given set of optimal lamination parameters. Lamination parameters can be easily calculated for a given layup.

It is well known that the relation between resultants (in-plane loads N and moments M) and strains (in-plane strains $\varepsilon^0$ and curvatures k) in a composite laminate is provided by stiffness matrices A, B and D via the equations:

$$\begin{Bmatrix} \{N\} \\ \{M\} \end{Bmatrix} = \begin{bmatrix} [A] & [B] \\ [B] & [D] \end{bmatrix} \begin{Bmatrix} \{\varepsilon^0\} \\ \{k\} \end{Bmatrix} \quad (1)$$

where A denotes the extensional stiffness, B denotes the coupling stiffness, and D denotes the bending stiffness of the laminate. Forming stiffness matrices A, B and D is an important step in the analysis of composite laminates. The A, B and D matrices for a composite laminate can be used to control, and hence design, the mechanical behavior of a laminate. Advantageously, the A, B, and D stiffness matrices can be completely defined in terms of lamination parameters and material properties.

Lamination parameter inversion is the process of finding families of layup alternatives with stiffness matrices specified by their lamination parameters. Because the laminations parameters are purely a function of the fiber angles and ply thicknesses (material properties are not involved), no engineering analysis (e.g., finite element analysis) is required. The alternatives are then examined to select designs that can be ranked with respect to feasibility and manufacturing cost.

A problem formulation and suitable algorithms for solving the lamination parameter inversion problem will be disclosed in detail below. By working with a layup strategy (or an ensemble of strategies), methods can be developed for: (1) determining a baseline layup; (2) exploring the space of layups with equivalent stiffness properties; and (3) applying design rules to present engineers with "designs of interest" for subsequent, more detailed study.

More specifically, in a post-processing phase, the lamination parameters can be used to provide families of angle-thickness stacking sequences through a set of procedures. Those families are generated by exploiting the properties of underdetermined systems of equations. An initial set of solutions is found by using Newton's method with random starting points to obtain layup angle sets that match a prescribed set of lamination parameters. Each layup angle set is then used to trace a family of solutions, again by applying Newton's method. The families so generated are then evaluated with respect to other constraints not yet incorporated, constraints including, but not limited to, those meeting traditional design rule objectives, as well as constraints motivated by manufacturing considerations. The lamination parameter inversion process enables a designer to investigate layup alternatives that can be used to improve ply shape, blending, automated fiber placement time and cost.

Figure 1:
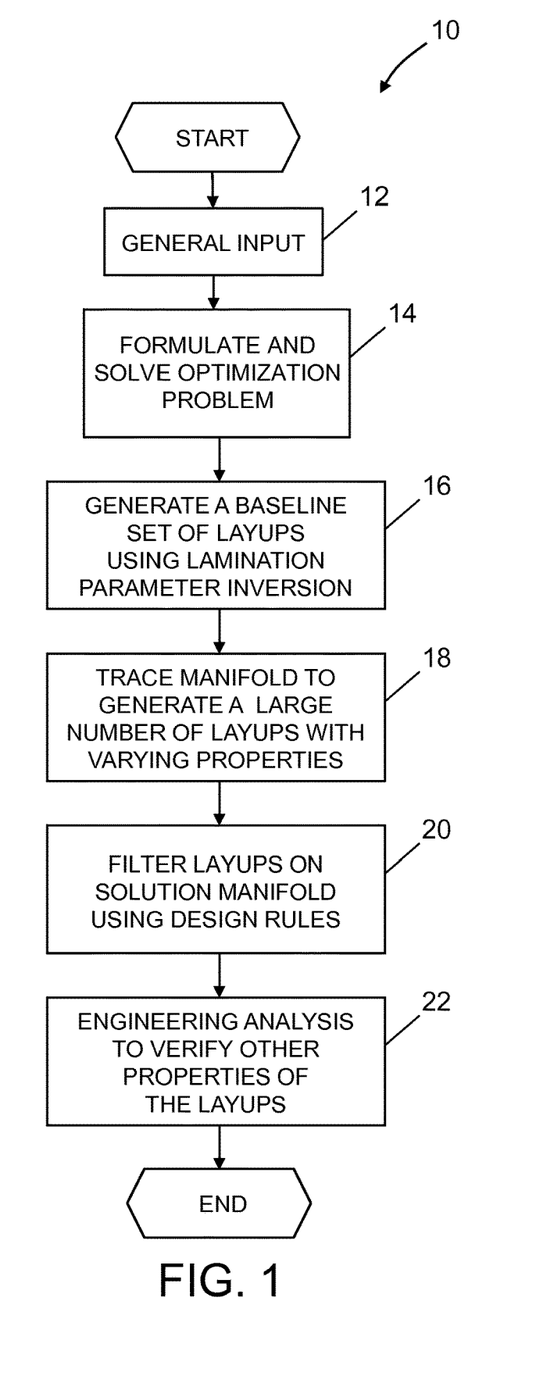
FIG. 1 is a flowchart identifying some of the stages of a design process that enables designers to discover stacking sequences of a composite laminate having minimum weight.

FIG. 1 is a flowchart identifying some of the processes of a design process 10 that enables designers to discover stacking sequences of a composite laminate having minimum weight. First, the designer inputs material properties, design values and manufacturing constraints into a computer system by means of a user interface (input process 12). Then an optimization problem with constraints is formulated and solved (optimization process 14). The inputs to optimization process 14 include parametric designs, constraint functions, and design objective. The outputs from optimization process 14 are optimized design parameters and target lamination parameters. The optimizer should take into account the feasible and manufacturable domain within which it can vary lamination parameters. Next a set of baseline layups is generated using lamination parameter inversion (baseline generation process 16). The inputs to baseline generation process 16 include the target lamination parameters, layup strategy (stacking sequence pattern), and number of solution attempts to be made. The output from baseline generation process 16 is a set of baseline layups having lamination parameters which match the target lamination parameters. Then alternative layups lying on a solution manifold are generated for each of the baseline layups using manifold tracing 18. The inputs to manifold tracing 18 are the target lamination parameters, the layup strategy, and the set of baseline layups. The output from manifold tracing 18 is an extensive set of alternative layups with varying properties. The alternative layups on the solution manifold are then filtered using design rules (filter 20). The inputs to filter 20 are the set of alternative layups and the design rules. The output from filter 20 is a reduced set of alternative layups (i.e., candidate layups) that satisfy the design rules. An engineering analysis 22 is then performed to verify other properties (i.e., assess the performance) of the candidate layups. The input to engineering analysis 22 is the selected set of alternative layups considered good candidates for final design. The output of engineering analysis 22 is data to support an acceptance/rejection judgment of each candidate layup by the designer.

Although not shown in FIG. 1, it should be understood that for any candidate layup that is accepted for manufacture, a laminated composite structure can be constructed having that accepted candidate layup using automated tow placement technology. The process depicted in FIG. 1 can be iterated until completion of the structural optimization. The optimized fiber placements are then converted into a computer program for controlling a multi-axis computer numerical control tow placement machine. During lay-up of a composite laminate, respective courses are precisely placed (i.e., laid) using a robotic tow placement head, the structure of which is well known in the art. The tows within a course are cut at the end of each traverse and the head is reset for the next run.

Figure 2:
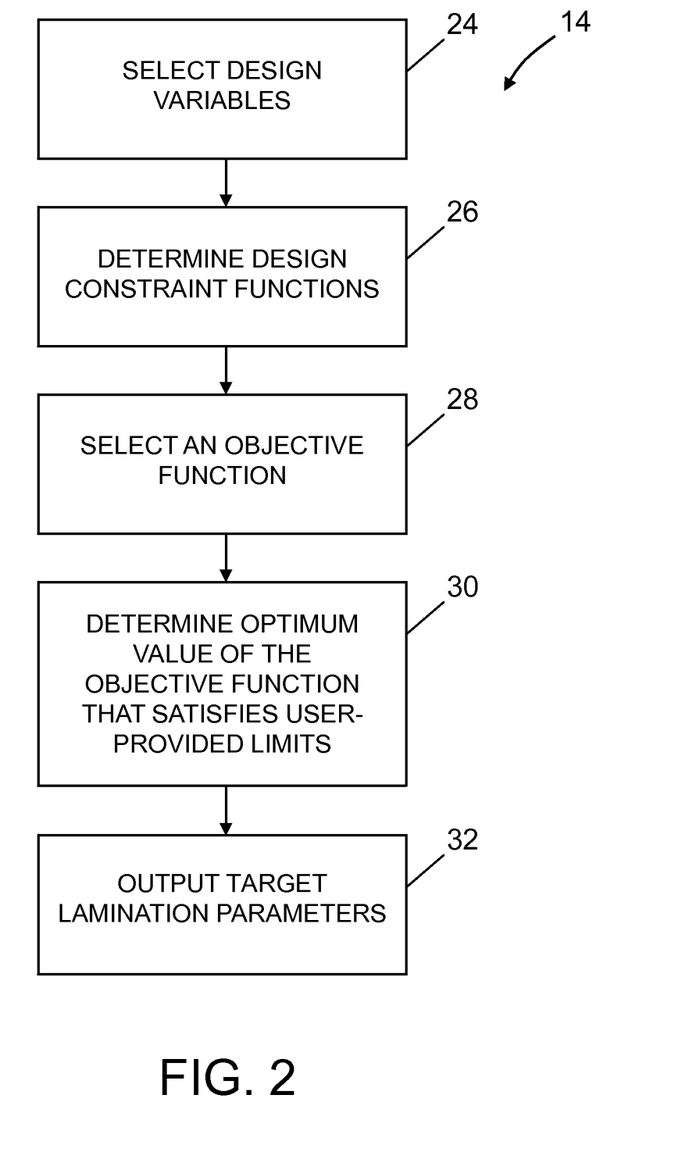
FIG. 2 is a flowchart identifying steps of a process for formulating and solving the optimization problem in the design process partially represented in FIG. 1.

FIG. 2 is a flowchart identifying steps of the process for formulating and solving the optimization problem in the design process partially represented in FIG. 1. These steps can be employed to determine the optimal values of the design variables. Formulating the design problem involves selection of design variables x (step 24), determination of design constraint functions c(x) (step 26), and selection of an objective function J(x) (e.g., weight) (step 28). For this problem, the design variables can be a set of fiber angles and ply thicknesses (this is the so-called "direct method") or a set of lamination parameters and total thickness. An optimization process is then executed to determine the optimum value of the objective function that satisfies user-provided limits on both design variables x and constraint functions c(x) (process 30). This is all done within the context of the standard constrained optimization problem: minimize J(x) subject to $c_U \leq c(x) \leq c_L$ and $x_U \leq x \leq x_L$. The outputs of this optimization process are target lamination parameters for which layup options are desired (step 32). If the optimization variables are fiber angles and ply thicknesses (direct method), then they must be converted to lamination parameters before proceeding.

Figure 3:
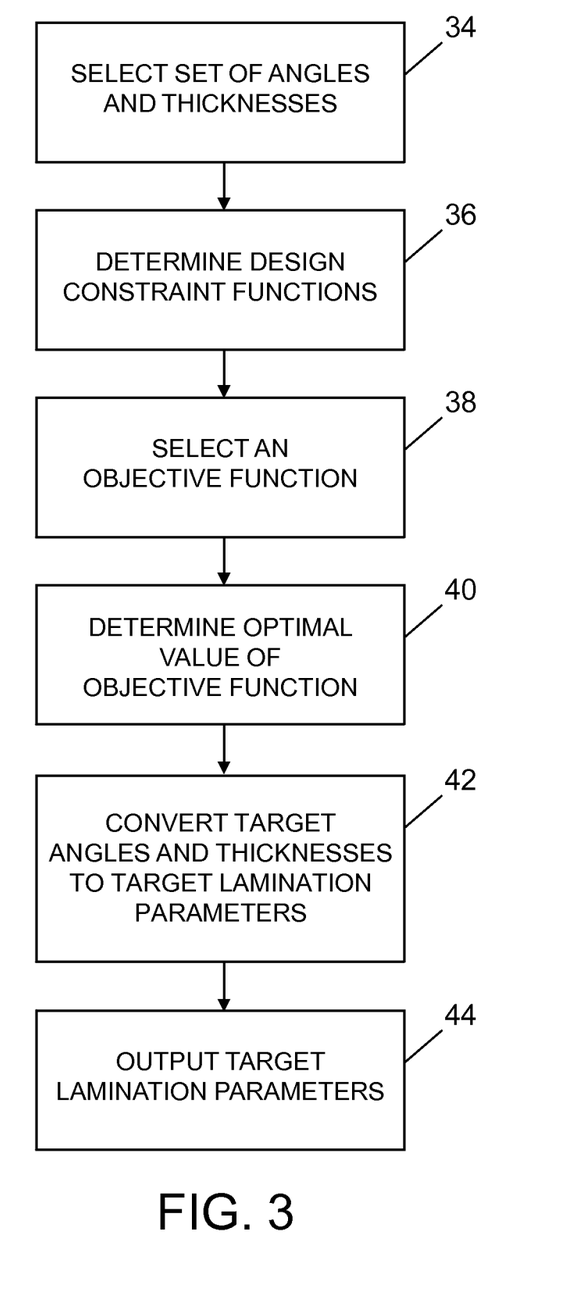
FIG. 3 is a flowchart identifying steps of a process for formulating and solving the optimization problem in accordance with one embodiment.

FIG. 3 is a flowchart identifying steps of a process for formulating and solving the optimization problem in cases where the design variables are a set of fiber angles and ply thicknesses. In accordance with this embodiment, formulating the design problem involves selection of a set of fiber angles and ply thicknesses (step 34), determination of design constraint functions c(x) (step 36), and selection of an objective function J(x) (step 38). An optimization process is then executed to determine the optimum value of the objective function that satisfies user-provided limits on both the design variables and constraint functions (process 40). The outputs of this optimization process are fiber angles and ply thicknesses for which layup options are desired. These fiber angles and ply thicknesses are then converted into target lamination parameters before proceeding (step 42). These target lamination parameters are then output to the software module that performs lamination parameter inversion (step 44).

Figure 4:
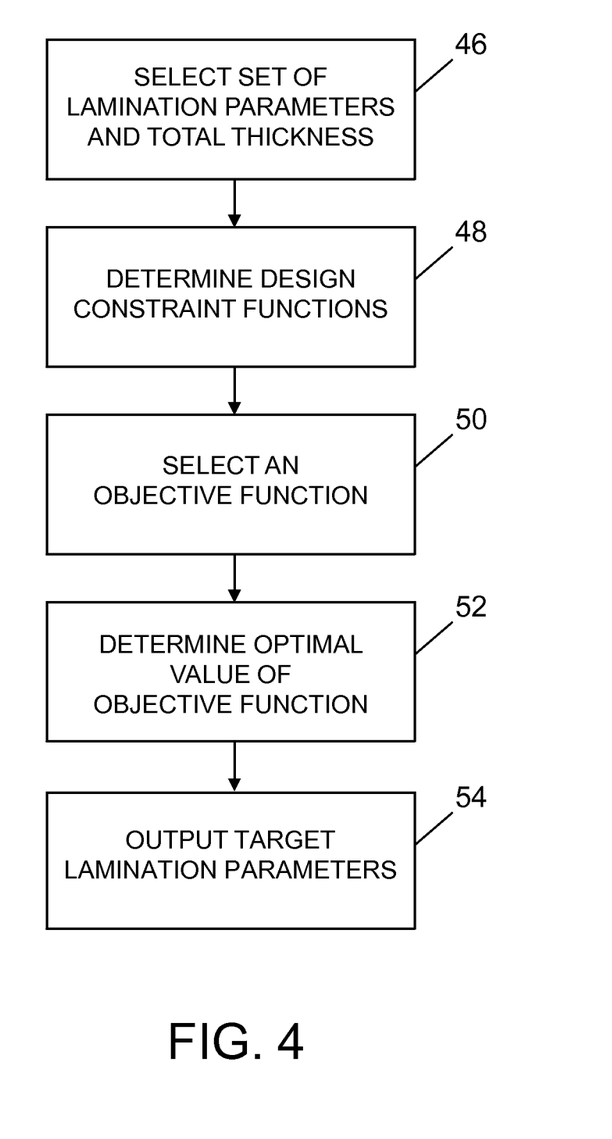
FIG. 4 is a flowchart identifying steps of a process for formulating and solving the optimization problem in accordance with an alternative embodiment.

FIG. 4 is a flowchart identifying steps of a process for formulating and solving the optimization problem in cases where the design variables are a set of lamination parameters and a total thickness. In accordance with this embodiment, formulating the design problem involves selection of a set of lamination parameters and a total thickness (step 46), determination of design constraint functions c(x) (step 48), and selection of an objective function J(x) (step 50). An optimization process is then executed to determine the optimum value of the objective function that satisfies user-provided limits on both the design variables and constraint functions (process 52). The outputs of this optimization process are a set of target lamination parameters (step 54).

Referring again to FIG. 1, further explanation will now be provided concerning processes 16, 18, 20 and 22.

As disclosed above, the set of baseline layups is generated using lamination parameter inversion. The inputs to the baseline layup generation process 16 are a target set of M lamination parameters, a layup strategy with N angle variables (N ≥M) (or an ensemble of layup strategies), and the number of solution attempts to be made ($n_{try}$). In accordance with one embodiment, the input layup strategy is employed to execute an underdetermined Newton's method with $n_{try}$ random initial points, looking for layups whose lamination parameters match the input target values. (Matching lamination parameters means that the different layups will still satisfy the constraints controlled by the stiffness matrices, but may not satisfy other constraints. These other constraints will be evaluated during the engineering analysis process 22.) The output of the baseline layup generation process 16 is a set of baseline layups.

In accordance with alternative embodiments, an algebraic geometry tool may be used instead of an underdetermined Newton's method to generate the set of baseline layups.

As disclosed above, alternative layups lying on a solution manifold are generated for each of the baseline layups using manifold tracing 18. The inputs to the manifold tracing 18 are the set of baseline layups and the sampling rate. Exploiting extra degrees of freedom in the layup strategy, additional layup solutions lying on the same solution manifold are determined for each baseline layup. More specifically, given a baseline layup solution, a curve tracing algorithm is recursively applied to determine points on the solution manifold containing that baseline layup. The output of the manifold tracing 18 is an extensive set of alternative layups.

As disclosed above, the alternative layups on the solution manifold are filtered using design rules. The inputs to filter 20 are the large number of alternative layups determined by manifold tracing. This large number of layup solutions is reduced to a moderate subset deemed to be desirable by the application of design rules. More specifically, a suitable set of design rules are applied to winnow down the large number of alternative layups. In one implementation, these design rules include limits on (i) the gap angle between any two layers the complete layup, (ii) the swerve angle, the change in layup angle between adjacent layers and (iii) adequate diversity of layup angle over every neighborhood of adjacent layers (e.g., four adjacent layers). B-tree technology can be used to record only those layup designs that are in some essential way different. The output of the filter 20 is one or more layups that satisfy design rules and are considered good candidates for detailed analysis.

As disclosed above, an engineering analysis 22 is performed to verify other properties of the candidate layups. The inputs to the engineering analysis 22 are the selected alternative layups that match the target lamination parameters obtained from the optimization process and passed through the design rule filter 20. Use of engineering analysis enables the designer to further assess the performance of the alternative layups that emerged from the filtering process. Those alternative layups which pass through the filter 20 will be subjected to engineering analysis 22 to confirm their quality and suitability. The engineering analysis 22 may include FEM runs to determine the maximum strains as well as perform a buckling analysis. This process may involve an "engineer-in-the-loop" selection process at its end and may involve re-running the original analysis code. The output of engineering analysis 22 is data representing a quantitative engineering assessment of the candidate layups.

The design process described above integrates lamination parameter inversion with laminate optimization to reduce weight and manufacturing cost while satisfying allowables and design rules.

Additional details concerning the mathematics involved in the above-described lamination parameter based methods for optimal design and manufacturing options can be found in the Appendix.

While composite structures and methods for their design have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit) capable of executing instructions.

In addition, the method claims set forth hereinafter should not be construed to require that the processes or steps recited therein be performed in alphabetical order (any alphabetical ordering in the claims is used solely for the purpose of referencing previously recited processes or steps) or in the order in which they are recited. Nor should they be construed to exclude any portions of two or more processes or steps being performed concurrently or alternatingly.

Appendix

The physical (unnormalized) lamination parameters are defined in terms of the fiber angles $\{\theta_k\}_{k=1}^K$ where $\theta_k$ is fiber angle between interface ordinates $Z_{k-1}$ and $Z_k$. Letting T denote the laminate thickness, these interface ordinates satisfy the relations $$-T/2 = Z_0 < Z_1 < \ldots < Z_{K-1} < Z_K = T/2 \quad (2)$$

If all layers have equal thickness T/K, then we will have $Z_k = -T/2 + kT/K$, $k = 0, 1, \ldots, K$. The extensional, coupling and bending lamination parameters are then respectively defined by:

$$V_\lambda^A = \sum_{k=1}^K f_\lambda(\theta_k)(Z_k - Z_{k-1}) \quad (3)$$

$$V_\lambda^B = \sum_1^K f_\lambda(\theta_k)(Z_k^2 - Z_{k-1}^2)/2 \quad (4)$$

$$V_\lambda^D = \sum_1^K f_\lambda(\theta_k)(Z_k^3 - Z_{k-1}^3)/3 \quad (5)$$

$$(f_0, f_1, f_2, f_3, f_4)(\theta) = (1, \cos 2\theta, \sin 2\theta, \cos 4\theta, \sin 4\theta) \quad (6)$$

Observe that $V_0^A = T$, $V_0^B = 0$, $V_0^D = T^3/12$, so that these lamination parameters are never in play. By scaling the values of ($V_\lambda^A$, $V_\lambda^B$, $V_\lambda^D$), we define normalized LPs ($v_\lambda^A$, $v_\lambda^B$, $v_\lambda^D$) such that $|v_\lambda^X| \leq 1$. The extensional, coupling and bending normalized lamination parameters are respectively defined by $$v_\lambda^A = (1/T)V_\lambda^A = (1/2)\sum_{k=1}^K f_\lambda(\theta_k)(z_k - z_{k-1}) \quad (7)$$

$$v_\lambda^B = (4/T^2)V_\lambda^B = (1/2)\sum_{k=1}^K f_\lambda(\theta_k)(z_k^2 - z_{k-1}^2) \quad (8)$$

$$v_\lambda^D = (12/T^3)V_\lambda^D = (1/2)\sum_{k=1}^K f_\lambda(\theta_k)(z_k^3 - z_{k-1}^3) \quad (9)$$

where the normalized interface ordinates $z_k$ are specified by $z_k = (2/T)Z_k$. These normalized interface ordinates $z_k$ all lie in the interval $[-1, 1]$.

Once the desired (i.e., target) normalized lamination parameters have been determined, one is faced with the problem of determining a layup that generates those normalized lamination parameters. This operation can be divided into two parts: (1) the determination of at least a single layup that generates the specified normalized lamination parameters; and (2) the determination of alternative layups whenever the number of available layup angles (degrees of freedom) exceeds the number of normalized lamination parameters to be matched. By using a single starting solution point, it is possible to trace a manifold of solutions. For both of these problems, the method of Underdetermined Newton's Method has been found to be fruitful. That method will now be described.

The problem to be solved is this: Given values for a set of M normalized lamination parameters V, determine a layup that realizes those parameters. Supposing that the desired layup consists of K layers, but that only $N \geq M$, (but still $N \leq K$) angles are free to vary (because of symmetry or some other reason). One can attempt to solve the system of M equations in N unknowns, $V = F(\Theta)$, where $\Theta$ is a vector of free angle variables $\theta_n$, $n = 1:N$. To solve this problem, one can apply Newton's Method, expressed by the well-known iteration:

$$\Theta_{r+1} = \Theta_r - [\partial F/\partial \Theta]^{-1}(F(\Theta_r) - V) \quad (10)$$

Computing the inverse of a non-square matrix when M<N can be difficult. However, this difficulty can be overcome by employing the Moore-Penrose pseudo-inverse associated with linear least squares data fitting. (For a linear system of the form Ax=b, dim(b)=m<n=dim(x), the Moore-Penrose pseudo inverse selects the minimum norm solution among all x satisfying Ax=b. The pseudo inverse is conventionally denoted $A^+$ and is readily computed from the singular value decomposition of A. If A is full rank, it is given by $A^+ = A^T(AA^T)^{-1}$.) The specification of angle degrees of freedom for each of the K layers amounts to the specification of a layup strategy. A very simple example is the specification of nine angles for a symmetric layup with eighteen layers, for which one has the obvious layup strategy:

$$[\theta_1, \theta_2, \theta_3, \theta_4, \theta_5, \theta_6, \theta_7, \theta_8, \theta_9]_s$$

Here, the subscript "s" indicates symmetric reflection about the center plane between two adjacent layers with angle layup $\theta_9$. This is but one example of a "layup strategy", a term used to describe the specification of angle degrees of freedom used to match some particular set of normalized lamination parameters. For the purpose of exploring the feasibility domains for symmetric and balanced-symmetric layups, one can employ symmetric layup strategies of the form $$[\theta_1, \theta_2, \ldots, \theta_N]_s, N \geq 8, K = 2N$$

Alternatively, more elaborate layup strategies can be employed. The following examples display six and seven degree of freedom strategies that combine symmetry with angle balancing:

$$[\pm\theta_1, \pm\theta_2, \pm\theta_3, \pm\theta_4, \pm\theta_5, \pm\theta_6]_s$$

$$[\pm\theta_1, \pm\theta_2, \pm\theta_3, \pm\theta_4, \pm\theta_5, \pm\theta_6, \pm\theta_7]_s$$

These could be used to seek layups for the six-dimensional space ($v_1^A$, $v_3^A$, $v_1^D$, $v_2^D$, $v_3^D$, $v_4^D$), with all other normalized lamination parameters taken to be zero. Moreover, any arbitrary reordering of the above angles would provide a usable layup strategy for the same space of normalized lamination parameters.

Having outlined the application of Newton's Method to solving underdetermined systems, we now show how the same approach can be used to trace a manifold of solutions. We begin by considering the problem of tracing a curve of solutions in the situation when dim(Θ)=N=M+1. Consider the system of equations:

$$F(\Theta)-V=0, \dim(\Theta)=N=M+1=\dim(V)+1$$

Since this system has a single extra degree of freedom, it makes sense to trace a one parameter family of solutions by computing points on a curve Θ(s) satisfying $$F(\Theta(s))-V=0$$

In fact, one can compute a sequence of points $\Theta_\nu$ on the curve Θ(s) by way of the following algorithm:

for $\nu=0, 1, 2$: $\Theta_{\nu+1}^{(0)}=\Theta_\nu+hM_\nu$, where $(\partial F/\partial \Theta)_\nu M_\nu=0$, $|M_\nu|=1$ for $r=0, 1, \ldots,$ converge: $\Theta_{\nu+1}^{(r+1)}=\Theta_{\nu+1}^{(r)}-[(\partial F/\partial \Theta)(\Theta_{\nu+1}^{(r)})]^+(F(\Theta_{\nu+1}^{(r)})-V)$ That is, points $\Theta_\nu$ along a solution curve are generated by solving the system F(Θ)-V=0 via the Underdetermined Newton's Method. At each step, the next point on the curve is initially estimated to be $\Theta_{\nu+1}^{(0)}$, which is obtained by adding a small multiple of the null space vector $M_\nu$ for the matrix $(\partial F/\partial \Theta)_\nu$. A good value for h has been found by computational experiment to be h=0.02. This process can be used to trace solution manifolds of dimension N−M>1. The trick is to hold fixed (N−M−1) of the variable angles in Θ and then trace the resulting curve. Then, each point on such a curve can be used as the starting point for an alternative curve tracing process. Thus, a subsidiary curve can be traced by keeping fixed a different subset of (N−M) angles in Θ. This process is repeated recursively through (N−M) levels, thus tracing out a manifold of solutions. For each solution, the lamination parameters defined by equations (3), (4) and (5) above can be used to calculate the A, B and D stiffness matrices for a candidate composite layup. The 12 unnormalized lamination parameters:

$$(V_1^A, V_2^A, V_3^A, V_4^A), (V_1^B, V_2^B, V_3^B, V_4^B), (V_1^D, V_2^D, V_3^D, V_4^D)$$

help define A, B and D by way of the following equations:

$$\begin{bmatrix} A_{11} & A_{12} & A_{16} \\ A_{21} & A_{22} & A_{26} \\ A_{61} & A_{62} & A_{66} \end{bmatrix} = \quad (11)$$

$$\begin{bmatrix} U_1+U_2V_1^A+U_3V_3^A & U_4-U_3V_3^A & (U_2/2)V_2^A+U_3V_4^A \\ U_4-U_3V_3^A & U_1-U_2V_1^A+U_3V_3^A & (U_2/2)V_2^A-U_3V_4^A \\ (U_2/2)V_2^A+U_3V_4^A & (U_2/2)V_2^A-U_3V_4^A & U_5-U_3V_3^A \end{bmatrix}$$

$$\begin{bmatrix} B_{11} & B_{12} & B_{16} \\ B_{21} & B_{22} & B_{26} \\ B_{61} & B_{62} & B_{66} \end{bmatrix} = \quad (12)$$

$$\begin{bmatrix} U_1+U_2V_1^B+U_3V_3^B & U_4-U_3V_3^B & (U_2/2)V_2^B+U_3V_4^B \\ U_4-U_3V_3^B & U_1-U_2V_1^B+U_3V_3^B & (U_2/2)V_2^B-U_3V_4^B \\ (U_2/2)V_2^B+U_3V_4^B & (U_2/2)V_2^B-U_3V_4^B & U_5-U_3V_3^B \end{bmatrix}$$

$$\begin{bmatrix} D_{11} & D_{12} & D_{16} \\ D_{21} & D_{22} & D_{26} \\ D_{61} & D_{62} & D_{66} \end{bmatrix} = \quad (13)$$

$$\begin{bmatrix} U_1+U_2V_1^D+U_3V_3^D & U_4-U_3V_3^D & (U_2/2)V_2^D+U_3V_4^D \\ U_4-U_3V_3^D & U_1-U_2V_1^D+U_3V_3^D & (U_2/2)V_2^D-U_3V_4^D \\ (U_2/2)V_2^D+U_3V_4^D & (U_2/2)V_2^D-U_3V_4^D & U_5-U_3V_3^D \end{bmatrix}$$

where $U_1$, $U_2$, $U_3$, $U_4$, and $U_5$ are material invariants that depend only on the ply material properties. As an example, the in-plane material invariants are defined in terms of a material's orthotropic material properties $Q_{ij}$ by the relations $$U_1=(3 Q_{11}+3 Q_{22}+2Q_{12}+4 Q_{66})/8$$

$$U_2=(Q_{11}-Q_{22})/2$$

$$U_3=(Q_{11}+Q_{22}-2Q_{12}-4Q_{66})/8$$

$$U_4=(Q_{11}+Q_{22}+6Q_{12}-4Q_{66})/8$$

$$U_5=(Q_{11}+Q_{22}-2Q_{12}+4Q_{66})/8 \quad (14)$$

The material properties $Q_{ij}$ in turn are defined in terms of elastic coefficients $E_{11}$, $E_{22}$, $G_{12}$ and Poisson's ratio $v_{12}$ by these relations $$Q_{11} = \frac{E_{11}}{1-v_{12}^2 \frac{E_{22}}{E_{11}}} \quad (15)$$

$$Q_{12} = \frac{v_{12}E_{22}}{1-v_{12}^2 \frac{E_{22}}{E_{11}}} \quad (16)$$

$$Q_{22} = \frac{E_{22}}{1-v_{12}^2 \frac{E_{22}}{E_{12}}} \quad (17)$$

$$Q_{66} = G_{12} \quad (18)$$

For the process of optimization, it is useful to employ total thickness T and normalized lamination parameters defined by equations (7), (8) and (9). The normalized parameters satisfy the bounds, useful in the context of optimization:

$$-1 \leq (v_1^A, v_2^A, v_3^A, v_4^A) \leq 1 \quad (19)$$

$$-1 \leq (v_1^B, v_2^B, v_3^B, v_4^B) \leq 1 \quad (20)$$

$$-1 \leq (v_1^D, v_2^D, v_3^D, v_4^D) \leq 1 \quad (21)$$

When this procedure is followed, the un-normalized lamination parameters can be recovered by the following relations:

$$V_\lambda^A = T v_\lambda^A \quad (22)$$

$$V_\lambda^B = (T^2/4) v_\lambda^B \quad (23)$$

$$V_\lambda^D = (T^3/12) v_\lambda^D \quad (24)$$

Then, by employing equations (11)-(24), code can be written to calculate the values of the A, B and D matrices given the normalized lamination parameters, the thickness T, and lamina material properties $E_{11}$, $E_{22}$, $v_{12}$, and $G_{12}$.

The invention claimed is:

1. A method for designing and manufacturing a composite laminate, the method comprising:
   (a) generating target lamination parameters for a composite laminate using structural optimization to optimize a weight function subject to design and/or manufacturing constraints;
   (b) generating a baseline set of layups having lamination parameters which match the target lamination parameters;
   (c) determining additional layup solutions lying on a same solution manifold for each baseline layup, each solution manifold being a respective set of alternative designs having identical stiffness properties;
   (d) filtering layups on solution manifolds using design rules to produce a reduced set of candidate layups, wherein the design rules include limits on (i) the gap angle between any two layers of the complete layup, (ii) the swerve angle, the change in layup angle between adjacent layers, and (iii) adequate diversity of layup angle over every neighborhood of adjacent layers;
   (e) verifying maximum strain and buckling properties of the candidate layups by performing an engineering analysis using a finite element model; and
   (f) manufacturing a composite laminate having a layup corresponding to a candidate layup having verified maximum strain and buckling properties.

2. The method as recited in claim 1, wherein each of the candidate layups has stiffness properties which are similar to stiffness properties characterized by the target lamination parameters.

3. The method as recited in claim 1, wherein process (a) comprises:
   selecting design variables;
   determining design and manufacturing constraints;
   selecting an objective weight function; and
   determining an optimal value of the objective weight function that satisfies user-provided limits on both the design variables and the constraints by solving a constrained optimization problem,
   wherein the target lamination parameters are a function of optimal design variables corresponding to the optimal value of the objective function.

4. The method as recited in claim 3, wherein the design variables comprise a set of fiber angles and ply thicknesses, further comprising converting the optimal design variables corresponding to the optimal value of the objective function into the target lamination parameters.

5. The method as recited in claim 3, wherein the design variables comprise a set of lamination parameters and total thickness.

6. The method as recited in claim 1, wherein process (b) comprises:
   defining a layup strategy;
   selecting a number of solution attempts to be made; and
   employing the layup strategy, executing a mathematical method starting with a number of random initial points and searching for layups whose lamination parameters match the target lamination parameters,
   wherein the number of random initial points equals the number of solution attempts to be made.

7. The method as recited in claim 6, wherein the mathematical method is an underdetermined Newton's method or an algebraic geometry method.

8. The method as recited in claim 6, wherein process (c) comprises recursively applying a curve tracing algorithm to determine points on the solution manifold containing the baseline layup.

9. A method for manufacturing a laminated composite structure using plies of fiber-reinforced plastic, the method comprising:
   (a) determining target lamination parameters for a composite laminate using structural optimization to optimize a weight function subject to design and/or manufacturing constraints;
   (b) determining a set of baseline layups whose lamination parameters match the target lamination parameters using lamination parameter inversion to find families of alternative layups with stiffness matrices specified by their lamination parameters;
   (c) determining alternative layups lying on a solution manifold for each of the baseline layups, each solution manifold being a respective set of alternative designs having identical stiffness properties;
   (d) selecting alternative layups which satisfy a set of design rules, wherein the design rules include limits on (i) the gap angle between any two layers of the complete layup, (ii) the swerve angle, the change in layup angle between adjacent layers, and (iii) adequate diversity of layup angle over every neighborhood of adjacent layers;
   (e) verifying maximum strain and buckling properties of a selected alternative layup by performing an engineering analysis using a finite element model; and
   (f) manufacturing a laminated composite structure having the selected alternative layup.

10. The method as recited in claim 9, wherein process (a) comprises:
    selecting design variables;
    determining design and manufacturing constraints;
    selecting an objective weight function; and
    determining an optimal value of the objective weight function that satisfies user-provided limits on both the design variables and the constraints by solving a constrained optimization problem,
    wherein the target lamination parameters are a function of optimal design variables corresponding to the optimal value of the objective function.

11. The method as recited in claim 10, wherein the design variables comprise a set of fiber angles and ply thicknesses, further comprising converting the optimal design variables corresponding to the optimal value of the objective function into the target lamination parameters.

12. The method as recited in claim 10, wherein the design variables comprise a set of lamination parameters and total thickness.

13. The method as recited in claim 9, wherein process (b) comprises:
    defining a layup strategy;
    selecting a number of solution attempts to be made; and
    employing the layup strategy, executing a mathematical method that searches for layups whose lamination parameters match the target lamination parameters.

14. The method as recited in claim 13, wherein the mathematical method is an underdetermined Newton's method.

15. The method as recited in claim 13, wherein process (c) comprises recursively applying a curve tracing algorithm to determine points on the solution manifold containing the baseline layup.

16. The method as recited in claim 9, wherein the engineering analysis comprises determination of maximum strains and buckling analysis.

17. The method as recited in claim 9, wherein at least process (b), (c) and (e) are performed by a computer system.

18. The method as recited in claim 9, wherein process (f) comprises laying tows of fiber-reinforced plastic material using an automated tow placement machine.

19. A method for designing and manufacturing a composite laminate, the method comprising:
  generating target lamination parameters for a composite laminate using structural optimization to optimize a weight function subject to design and/or manufacturing constraints;
  generating a baseline set of layups having lamination parameters which match the target lamination parameters using lamination parameter inversion to find families of alternative layups with stiffness matrices specified by their lamination parameters;
  determining additional layup solutions lying on a same solution manifold for each baseline layup, each solution manifold being a respective set of alternative designs having identical stiffness properties; and
  manufacturing a composite laminate having a layup corresponding to an additional layup solution.

20. The method as recited in claim 19, further comprising:
  filtering layups on solution manifolds using design rules to produce a reduced set of candidate layups, wherein the design rules include limits on (i) the gap angle between any two layers of the complete layup, (ii) the swerve angle, the change in layup angle between adjacent layers, and (iii) adequate diversity of layup angle over every neighborhood of adjacent layers; and
  verifying maximum strain and buckling properties of the candidate layups by performing an engineering analysis using a finite element model,
  wherein the manufactured composite laminate has a layup corresponding to a candidate layup having maximum strain and buckling verified properties.

* * * * *